US005774654A

United States Patent [19]

Maki

[11] Patent Number: 5,774,654
[45] Date of Patent: Jun. 30, 1998

[54] COMMUNICATION TERMINAL APPARATUS AND COMMUNICATION METHOD FOR COMMUNICATING DATA THROUGH A PLURALITY OF COMMUNICATION CHANNELS

[75] Inventor: Nobuhiko Maki, Kawasaki, Japan

[73] Assignee: Canon Kabushiki Kaisha, Tokyo, Japan

[21] Appl. No.: 790,111

[22] Filed: Jan. 29, 1997

Related U.S. Application Data

[63] Continuation of Ser. No. 144,559, Nov. 2, 1993, abandoned.

[30] Foreign Application Priority Data

Nov. 5, 1992 [JP] Japan ................................. 4-295608

[51] Int. Cl.$^6$ .................................................. H01H 67/00
[52] U.S. Cl. ............................. 395/200.3; 395/200.68; 370/235; 358/426; 340/825.03
[58] Field of Search ............................ 358/400, 401, 358/406, 425, 426; 370/110.1, 94.1, 235, 60; 340/825.03, 825.01; 379/219; 395/200.3, 200.68, 200.69

[56] References Cited

U.S. PATENT DOCUMENTS

| | | | |
|---|---|---|---|
| 3,632,885 | 1/1972 | Herold | 179/15 BA |
| 4,706,127 | 11/1987 | Nobuta | 358/280 |
| 4,970,723 | 11/1990 | Lin | 370/110.1 |
| 5,163,042 | 11/1992 | Ochiai | 370/17 |
| 5,187,710 | 2/1993 | Chau et al. | 370/110.1 |
| 5,265,155 | 11/1993 | Castro | 379/112 |
| 5,278,665 | 1/1994 | Sawada et al. | 358/442 |
| 5,303,297 | 4/1994 | Hillis | 379/63 |
| 5,329,523 | 7/1994 | Saito et al. | 370/58.1 |
| 5,333,132 | 7/1994 | Chuniaud et al. | 370/58.1 |
| 5,341,377 | 8/1994 | Ohtani | 370/110.1 |
| 5,365,517 | 11/1994 | Kato et al. | 370/58.3 |
| 5,367,522 | 11/1994 | Otani | 370/84 |
| 5,426,645 | 6/1995 | Haskin | 370/118 |

FOREIGN PATENT DOCUMENTS

| | | |
|---|---|---|
| 0409622 | 1/1991 | European Pat. Off. . |
| 3523819 | 1/1986 | Germany . |
| 3624705 | 2/1987 | Germany . |

OTHER PUBLICATIONS

Jee Journal of Electronic Engineering, vol. 8 SUP, 1987, Tokyo JP pp. 48–50, article of H. Suzuki "The CCITT G4 Facsimile in the Age of ISDNs".

Nachrichten Elektronik Und Telematik, vol. 46, No. 5, May 1992, Heidelberg DE, pp. 234–239, article of G. Weth "Einfache Bedienung entscheidet über Erfolg".

Minoli, *First, Second & Next Generation LANs*, 1994, p. 223.

*Primary Examiner*—Emanuel Todd Voeltz
*Assistant Examiner*—Patrick Assouad
*Attorney, Agent, or Firm*—Fitzpatrick, Cella, Harper & Scinto

[57] ABSTRACT

When there are unused communication channels, it is checked whether an attribute of an image associated with transmission image data indicates color image data or monochrome image data. If the transmission image data is monochrome image data, the image data is transmitted through one of B channels of a line. If the transmission image data is color image data, and two B channels can be used, bulk transmission is performed by simultaneously using the two B channels. If it is determined that the two B channels cannot be simultaneously used, the image data is transmitted by using one of the B channels which is in a unused state.

15 Claims, 7 Drawing Sheets

| AREA CODE | COMMUNICATION TIME PER 10 YEN |
|---|---|
| 03 | 3 (min.) |
| 04 | 2 (min.) |
| 06 | 1 (min.) |

COMMUNICATION TERMINAL APPARATUS AND COMMUNICATION METHOD FOR COMMUNICATING DATA THROUGH A PLURALITY OF COMMUNICATION CHANNELS

This application is a continuation of Application Ser. No. 08/144,559 filed Nov. 2, 1993 now abandoned.

BACKGROUND OF THE INVENTION

The present invention relates to a communication terminal apparatus for performing communication upon determining the number of communication channels in accordance with transmission data, and a communication method therefor.

In a conventional communication terminal apparatus, communication is always performed with a maximum number of channels through which the apparatus can perform communication, regardless of the type of data to be communicated.

In the conventional communication terminal apparatus described above, since communication is always performed with the maximum number of channels regardless of the amount of data, communication cannot be performed with a communication channel count corresponding to the optimal cost for line usage or optimal communication time for the amount of transmission data.

SUMMARY OF THE INVENTION

The present invention has been made in consideration of the above situation, and has as its object to provide a communication terminal apparatus which can perform communication with an optimal number of channels for transmission data.

In order to achieve the above object, according to the present invention, there is provided a communication terminal apparatus, accommodating a line having a plurality of communication channels, for transmitting/receiving data through the plurality of communication channels, comprising means for detecting unused states of the plurality of communication channels, judging means for judging a data attribute associated with the amount of transmission data, and determining means for determining the number of channels, of the communication channels, used for transmission of the transmission data on the basis of the unused states and the data attribute.

In addition, according to the present invention, there is provided a communication terminal apparatus, accommodating a line having a plurality of communication channels, for transmitting/receiving data through the plurality of communication channels, comprising means for calculating a communication time on the basis of the amount of transmission data and the number of channels of the communication channels, means for calculating a usage for the line on the basis of charge information associated with the communication time and the line, and means for visually displaying the communication time and the usage, wherein an operator of the communication terminal apparatus selects the number of channels for transmitting the transmission data on the basis of visually displayed contents.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described in detail below with reference to the accompanying drawings.

[First Embodiment]

Figure 1:
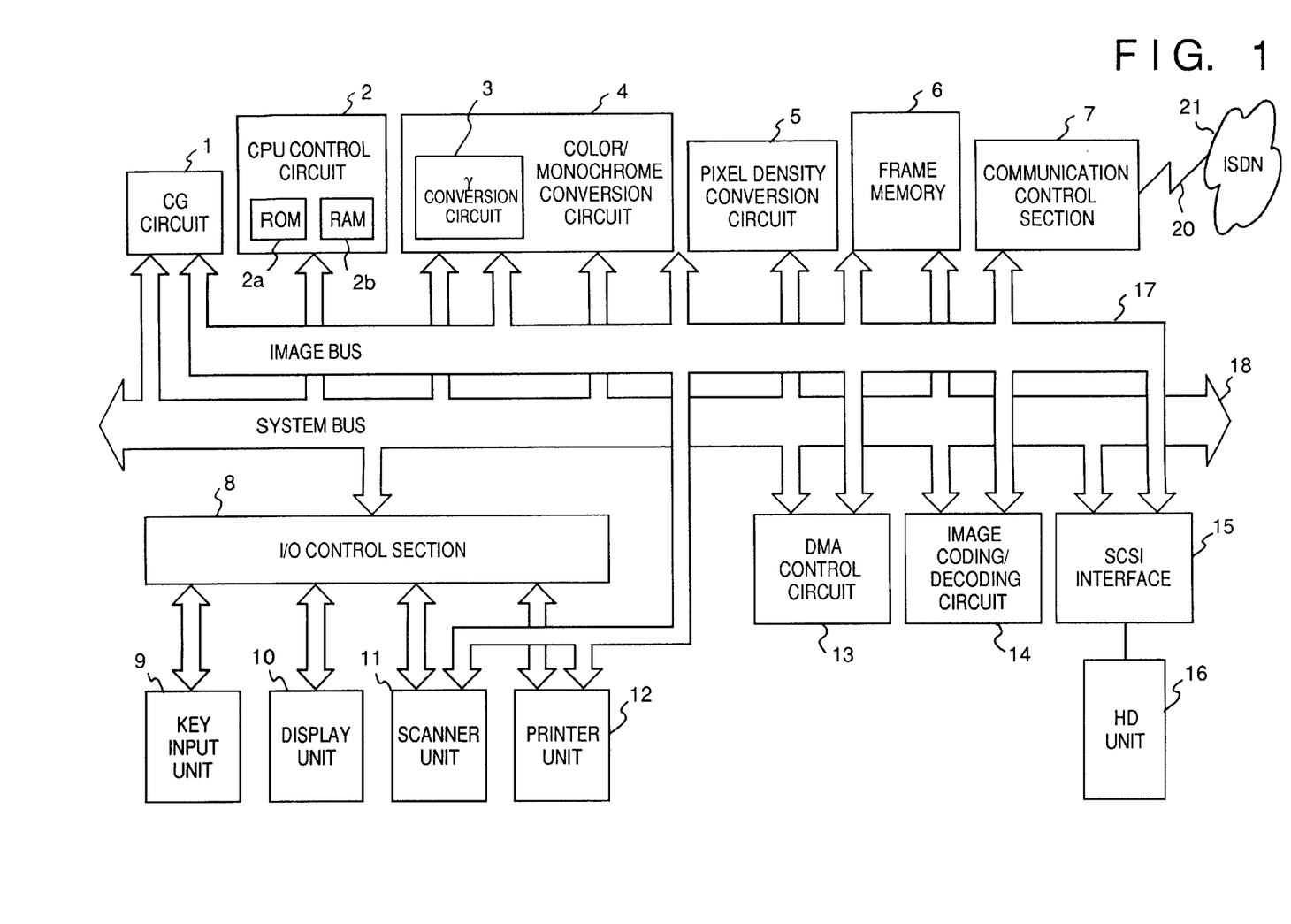
FIG. 1 is a block diagram showing the overall arrangement of a color/monochrome facsimile apparatus according to the first embodiment of the present invention.

FIG. 1 is a block diagram showing the overall arrangement of a color/monochrome facsimile apparatus (to be referred to as an apparatus hereinafter) according to the first embodiment of the present invention, which is connected to an integrated services digital network (ISDN) for providing two B channels at 64 kbits/s and one D channel at 16 kbits/s (commonly called 2B+D) as a user/network interface. Referring to FIG. 1, reference numeral 1 denotes a character generator (CG) circuit for generating characters to be printed on a report output from the apparatus; 2, a CPU control circuit having a ROM 2a and a RAM 2b and controlling the overall apparatus; and 13, a direct memory access (DMA) control circuit for performing inter-memory transfer of image data without the mediacy of the CPU control circuit 2.

Reference numeral 4 denotes a color/monochrome conversion circuit for converting C, M, Y, and K (cyan, magenta, yellow, and black) images into R, G, and B (red, green, and blue) images. The color/monochrome conversion circuit 4 has a γ conversion circuit 3 for converting R, G, and B images into C, M, Y, and K images and also performs conversion from a color image into a monochrome image or from a multivalued image into a binary image. Reference numeral 5 denotes a pixel density conversion circuit for converting a density of image data and reference numeral 6 denote a frame memory for developing image data in units of blocks.

Reference numeral 7 denotes a communication control section for performing outgoing/incoming call control and image data transmission/reception control with respect to a distant station terminal apparatus through a communication line 20, accommodated from the ISDN, by using a predetermined communication protocol; and 8, an I/O control section for controlling a key input unit 9, a display unit 10, a scanner unit 11, and a printer unit 12. The key input unit 9 serves to receive an instruction input by a key input operation by a user, such as a key input instruction input by operating a start button or a stop button, a copy count designation, and a page number designation, and the like. The display unit 10 displays a message on an LCD (not shown) and notifies the user of various information, e.g., a shortage of paper, a memory full state, and a shortage of ink, and various messages by turning on/off LDEs. The scanner unit 11 reads a document in accordance with designated modes, e.g., a paper size mode, a color/monochrome mode, and a density mode. The printer unit 12 serves to output image data and character data onto a recording sheet.

An image coding/decoding circuit 14 compresses/expands color and monochrome image data. A small computer system interface (SCSI) 15 provides the interface with a hard disk (HD) unit 16 as a nonvolatile memory. Reference numeral 17 denotes an image bus serving as a transmission path for image data; and 18, a system bus associated with the overall control of the apparatus.

The operation of the apparatus of the embodiment, especially determination of the number of channels used for data communication, will be described next. <Determination of the number of channels in accordance with the type of data>

Figure 2:
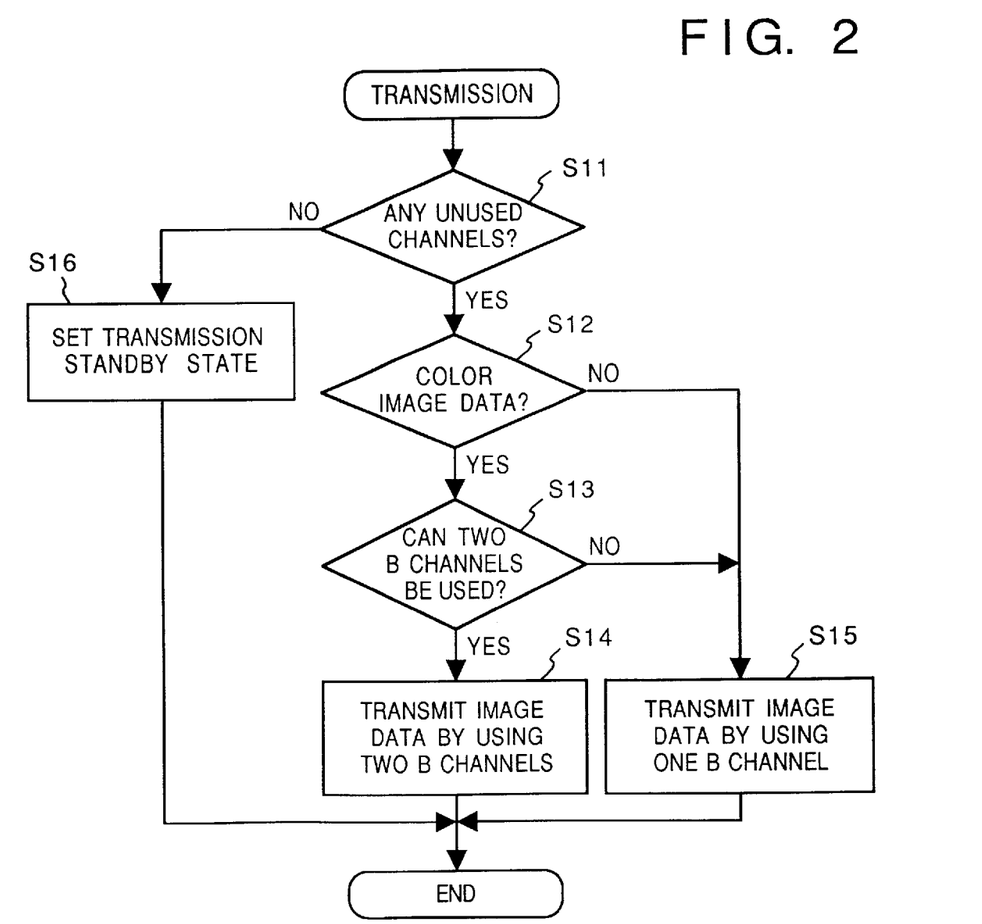
FIG. 2 is a flow chart showing the procedure for determining the number of channels in accordance with the type of image data in the apparatus according to the first embodiment.

FIG. 2 is a flow chart showing the procedure for determining the number of channels, in the apparatus according to the embodiment, depending on whether transmission image data is color image data or monochrome image data.

When the apparatus is set in the transmission mode, it is checked in step S11 whether any unused communication channels are present. If NO in step S11, the flow advances to step S16 to set the apparatus in a transmission standby state, thus terminating the operation.

If YES in step S11, the flow advances to step S12 to check an attribute of an image associated with the transmission image data, i.e., check whether the transmission image data is color image data (or data including color image data) or monochrome image data. If it is determined in step S12 that the transmission image data is monochrome image data, the flow advances to step S15 to transmit the image data by using one B channel, thus terminating the operation.

If it is determined in step S12 that the transmission image data is color image data, it is checked in step S13 whether the two B channels can be used. If NO in step S13, the flow advances to step S15 to transmit the image data by using one B channel. Thereafter, the operation is terminated.

If YES in step S13, i.e., if it is determined that the two B channels can be used, the flow advances to step S14 to transmit the image data by simultaneously using the two B channels, i.e., transmit the image data by a bulk transmission scheme. Thereafter, the operation is terminated. <Determination of the number of channels in accordance with resolution>

Figure 3:
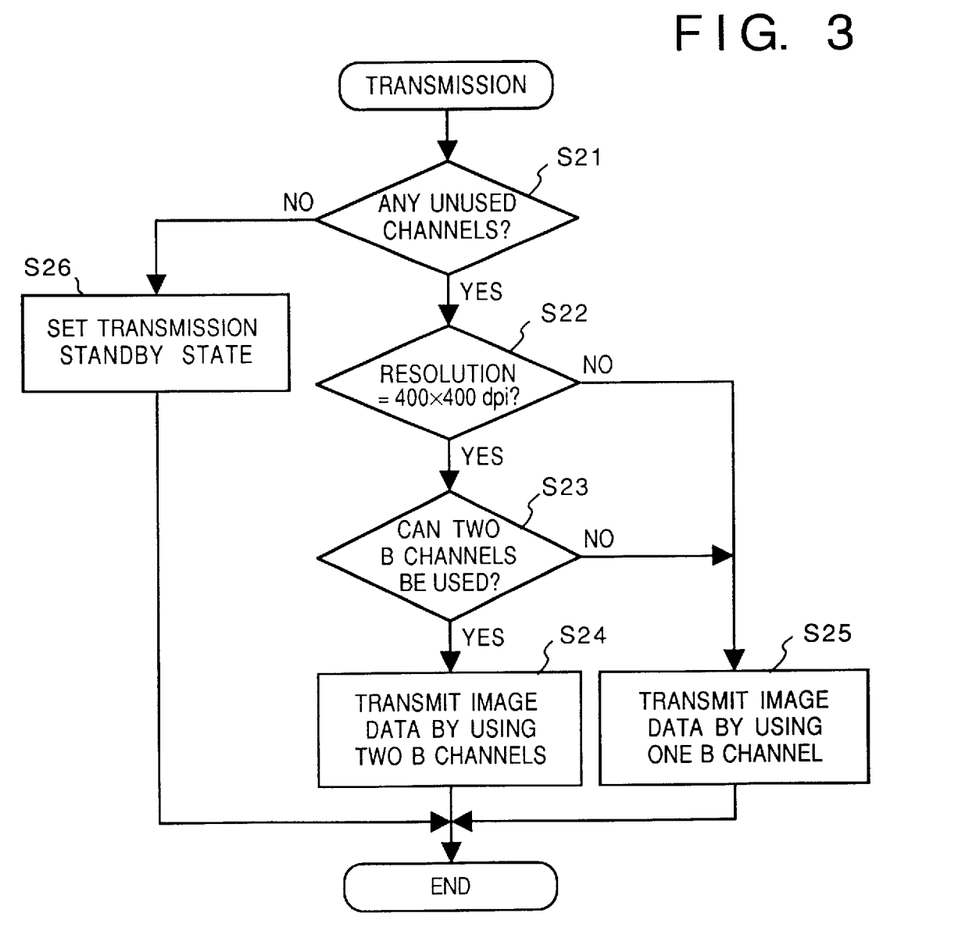
FIG. 3 is a flow chart showing the procedure for determining the number of channels in accordance with the resolution of image data in the apparatus according to the first embodiment.

FIG. 3 is a flow chart showing the procedure for determining the number of channels, in the apparatus of the embodiment, depending on whether the resolution of transmission image data is 400 dpi.

When the apparatus of the embodiment is set in the transmission mode, it is checked in step S21 whether any unused communication channels are present. If NO in step S21, the flow advances to step S26 to set the apparatus in a transmission standby state, thus terminating the operation. If YES in step S21, the flow advances to step S22 to check whether the resolution of the transmission image data is 400 dpi (or more), or lower than 400 dpi. If it is determined in step S22 that the resolution of the transmission image data is lower than 400 dpi, the flow advances to step S25 to transmit the image data by using one B channel, thus terminating the operation.

If it is determined in step S22 that the resolution of the transmission image data is 400 dpi, it is checked in step S23 whether the two B channels can be used. If NO in step S23, the flow advances to step S25 to transmit the image data by using one B channel. Thereafter, the operation is terminated.

If YES in step S23, i.e., if it is determined that the two B channels can be used, the flow advances to step S24 to transmit the image data by simultaneously using the two B channels, i.e., transmit the image data by the bulk transmission scheme. Thereafter, the operation is terminated. <Determination of the number of channels in accordance with the size of data>

Figure 4:
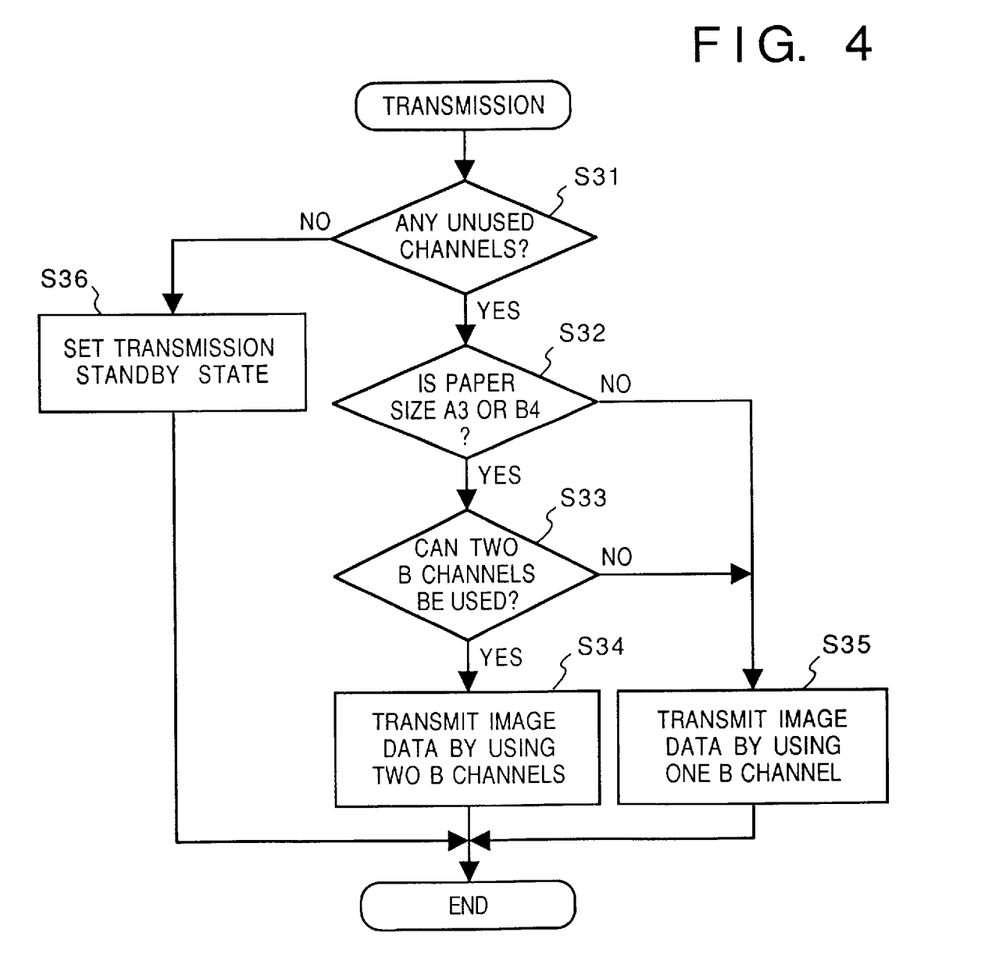
FIG. 4 is a flow chart showing the procedure for determining the number of channels in accordance with the size of image data in the apparatus according to the first embodiment.

FIG. 4 is a flow chart showing the procedure for determining the number of channels depending on whether the size of transmission image data is A3 or B4, or A4 or B5.

When the apparatus of the embodiment is set in the transmission mode, it is checked in step S31 whether any unused communication channels are present. If NO in step S31, the flow advances to step S36 to set the apparatus in a transmission standby state, thus terminating the operation.

If YES in step S31, the flow advances to step S32 to check whether the size of the transmission data is A3 or B4, or A4 or B5. If it is determined that the size of the transmission image data is A4 or B5, the flow advances to step S35 to transmit the image data by using one B channel, thus terminating the operation.

If it is determined in step S32 that the size of the transmission image data is A3 or B4, it is checked in step S33 whether the two B channels can be used. If NO in step S33, the flow advances to step S35 to transmit the image data by using one B channel. Thereafter, the operation is terminated.

If YES in step S33, the flow advances to step S34 to transmit the image data by simultaneously using the two B channels, i.e., transmit the image data by the bulk transmission scheme. Thereafter, the operation is terminated. <Determination of the number of channels in accordance with the number of pages of transmission image data>

Figure 5:
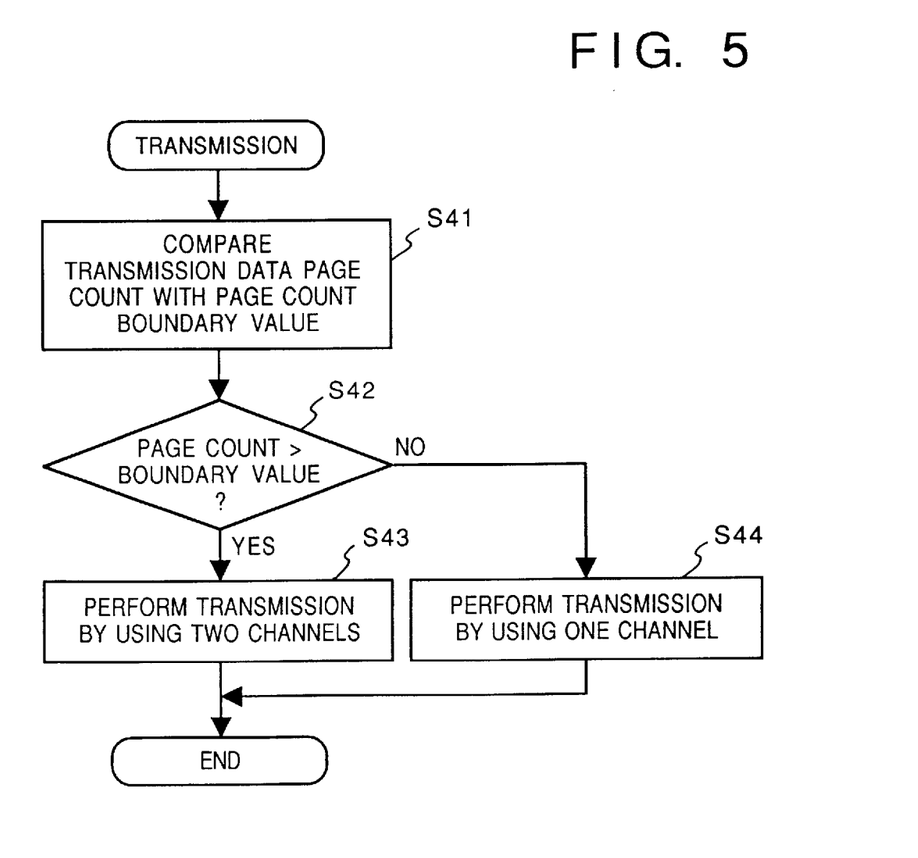
FIG. 5 is a flow chart showing the procedure for determining the number of channels in accordance with the number of pages of transmission data in the apparatus according to the first embodiment.

FIG. 5 is a flow chart showing the procedure for determining the number of channels depending on whether the number of pages of transmission image data exceeds a specified number of pages.

In step S41 in FIG. 5, a transmission data page count is compared with a page count boundary value stored in the ROM 2a in the CPU control circuit 2 in advance. If it is determined in step S42 that the transmission data page count is larger than the page count boundary value, the flow advances to step S43 to transmit the transmission data by simultaneously using the two B channels.

If it is determined in step S42 that the transmission data page count is smaller than the page count boundary value, the flow advances to step S44 to transmit the image data by using one B channel, thus terminating the operation.

In this manner, as the number of pages of transmission data increases, a larger number of communication channels are used, and vice versa.

As described above, the number of communication channels is determined in accordance with the attributes of an image associated with transmission image data. For example, a larger number of communication channels are used when color image data is transmitted than when monochrome image data is transmitted, thereby saving the cost for line usage and realizing effective use of the line.

In the above-described embodiment, in determining the number of channels in accordance with the resolution of transmission data, when the resolution is lower than 400 dpi, one B channel is used. However, the present invention is not limited to the embodiment described above. For example, when the resolution is lower than 300 dpi, one B channel may be used.

It is apparent that an image size as a criterion is not limited to the above-mentioned size. In addition, a color/monochrome facsimile apparatus is used as a facsimile apparatus in the above-described embodiment. However, the present invention can be applied to a monochrome facsimile apparatus.

In the above-described case where the number of channels is determined in accordance with the number of pages of transmission image data, the number of page count boundary values is not limited to one. For example, two page count boundary values may be set for color image data transmission and monochrome image data transmission, respectively. In addition, as in the case where 23B+D channels are supplied as interfaces for an ISDN, if three or more communication channels are available, a plurality of page count boundary values may be prepared in a stepwise manner.

[Second Embodiment]

The second embodiment of the present invention will be described below. Since the arrangement of a facsimile apparatus according to the second embodiment is the same as that of the facsimile apparatus according to the first embodiment, its illustration and description will be omitted.

Figure 6:
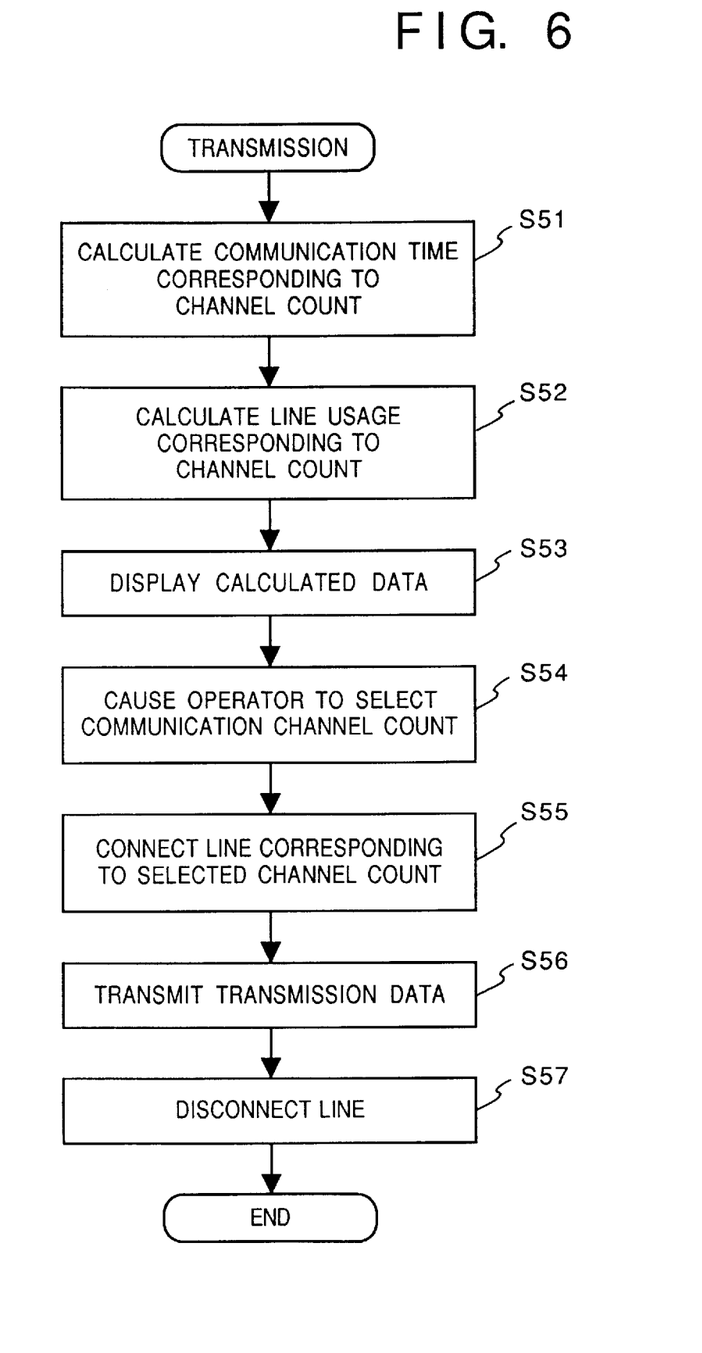
FIG. 6 is a flow chart showing a transmitting operation of an apparatus according to the second embodiment of the present invention.

FIG. 6 is a flow chart showing the operation of the apparatus of this embodiment in the transmission mode. In step S51 in FIG. 6, a CPU control circuit 2 of the apparatus calculates the cost for line usage and communication time corresponding to the number of channels used on the basis of the amount of transmission data and the transmission rate of a communication line. For example, a communication time in the use of n channels is calculated as follows:

$$n\text{-channel communication time} = \qquad (1)$$

$$\text{(transmission data amount)/(transmission rate per channel} \times n)$$

Figure 7:
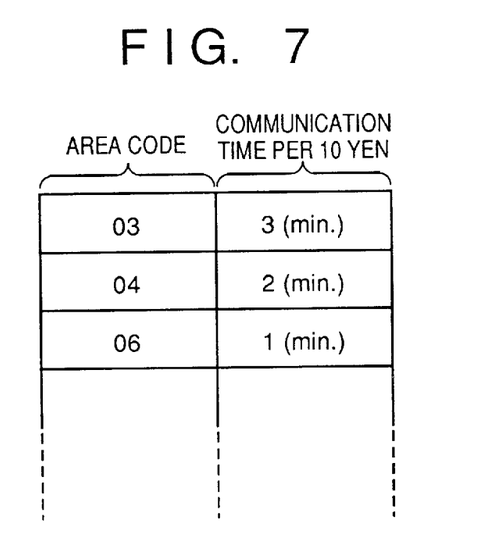
FIG. 7 is a view showing a communication time table with respect to a unit charge.

In step S52, for example, a communication time per 10 yen is obtained by referring to the communication time table shown in FIG. 7, which is stored in the ROM 2a of the CPU control circuit 2 in advance, on the basis of the communication time calculated in step S51, the area code of a data transmission destination, input by the operator, and the subscriber's telephone number of the apparatus. Thereafter, the cost for line usage per channel is calculated by the following equation, based upon the communication time obtained above.

$$\text{cost for line usage per channel} = \qquad (2)$$

$$\text{(total communication time/communication time per 10 yen)} \times 10$$

It is apparent that when n channels are used, the cost for line usage obtained by equation (2) is multiplied by n.

In step S53, the cost for line usage and the communication time calculated in steps S51 and S52 are displayed on the LCD of the display unit 10. In step S54, the operator is caused to select the number of communication channels through the key input unit 9. In step S55, a line corresponding to the number of communication channels selected in step S54 is connected.

In step S56, data is transmitted by using the line connected in step S55. Upon completion of the data transmission, the line is disconnected in step S57, thus terminating the operation.

In this manner, the cost for line usage and a communication time are calculated and displayed, and the operator is caused to select the number of communication channels on the basis of the calculated data, thereby allowing communication with a desired cost for line usage and a desired communication time. With this operation, a reduction in the cost for line usage and effective use of the line can be realized.

In the above-described embodiment, determination of the number of communication channels and connection of a line may be performed in an arbitrary order. In addition, as a facsimile apparatus, either a color/monochrome facsimile apparatus or a monochrome facsimile apparatus may be used.

Note that the present invention may be applied to both a system constituted by a plurality of units and an apparatus constituted by a single unit. In addition, as is apparent, the present invention can be applied to a case where the above-described operation can be realized by supplying programs to a system or an apparatus.

As many apparently widely different embodiments of the present invention can be made without departing from the spirit and scope thereof, it is to be understood that the invention is not limited to the specific embodiments thereof except as defined in the appended claims.

What is claimed is:

1. A communication terminal apparatus, accommodating a line having a plurality of communication channels, for transmitting image data through the plurality of communication channels to a communication party, each of the communication channels being a same kind and having a same capacity for transmitting data per unit time, said apparatus comprising:

detecting means for detecting unused states of the plurality of communication channels;

recognizing means for recognizing an attribute associated with the image data, the attribute indicating a data amount of the image data;

determining means for determining an optimal number of channels of the plurality of communication channels to be used for transmission of the image data, on the basis of the unused states detected by the detecting means and the attribute recognized by the recognizing means, said determining means being able to determine the optimal number of channels to be less than a total number of unused channels indicated by the unused states; and transmitting means for transmitting the image data to the communication party by distributing the image data among the determined number of channels of the plurality of communication channels, wherein said recognizing means recognizes the attribute of the image data by checking whether the image data is color image data or monochrome image data.

2. The apparatus according to claim 1, wherein said determining means determines the number of channels used for transmission such that a larger number of channels are used for transmission when the image data is color image data than when the image data is monochrome image data.

3. A communication terminal apparatus, accommodating a line having a plurality of communication channels, for transmitting image data through the plurality of communication channels to a communication party, each of the communication channels being a same kind and having a same capacity for transmitting data per unit time, said apparatus comprising:

detecting means for detecting unused states of the plurality of communication channels;

recognizing means for recognizing an attribute associated with the image data, the attribute indicating a data amount of the image data;

determining means for determining an optimal number of channels of the plurality of communication channels to be used for transmission of the image data, on the basis of the unused states detected by the detecting means and the attribute recognized by the recognizing means, said determining means being able to determine the optimal number of channels to be less than a total number of unused channels indicated by the unused states; and transmitting means for transmitting the image data to the communication party by distributing the image data among the determined number of channels of the plurality of communication channels, wherein said recognizing means recognizes the attribute of the image data by checking a resolution of the image data.

4. The apparatus according to claim 3, wherein said determining means determines the number of channels used for transmission such that the number of the used channels increases with an increase in the resolution of the image data.

5. The apparatus according to claim 1, wherein the line is an ISDN line having at least two B channels, the image data is distributed between the at least two B channels for transmission when said determining means determines that a plurality of channels are to be used to transmit the image data, and the image data is transmitted through one of the at least two B channels when said determining means determines that the image data can be transmitted by using one channel.

6. The apparatus according to claim 5, wherein when any of the two B channels is busy and at least two others of the at least two B channels are unused, and said determining means determines that a plurality of channels are required to transmit the image data, the image data is transmitted through the at least two of the at least two B channels which are unused.

7. A communication terminal apparatus, accommodating a line having a plurality of communication channels, for transmitting data through the plurality of communication channels, each of the communication channels being a same kind and having a same capacity for transmitting data per unit time, said apparatus comprising:

means for calculating a communication time on the basis of an amount of transmission data and an estimated number of channels of the communication channels to be used for transmission of the transmission data;

means for calculating a cost of usage for the line on the basis of the communication time and charge information associated with the line;

means for visually displaying the communication time and the cost of usage calculated by the calculating means; and means for manually selecting an actual number of channels of the communication channels to be used for transmission, wherein an operator of said communication terminal apparatus selects the actual number of channels of the plurality of communication channels used for the transmission on the basis of contents of the visual display, and wherein the channels, the actual number of which is selected, have a common communication route to the one destination.

8. The apparatus according to claim 7, wherein the charge information includes a cost of communication per channel.

9. A communication method of transmitting data through a plurality of communication channels, each of the communication channels being a same kind and having a same capacity for transmitting data per unit time, said method comprising the steps of:

calculating a communication time on the basis of an amount of transmission data and an estimated number of channels of the communication channels to be used for transmission to one destination;

calculating a cost of usage for a line on the basis of the communication time and charge information associated with the line;

visually displaying the communication time and the cost of usage, and manually selecting an actual number of channels for transmitting the transmission data on the basis of displayed contents which are visually displayed at said visually displaying step, wherein the channels, the actual number of which is selected, have a common communication route to the one destination.

10. An image communication apparatus for image transmission, comprising:

display means for displaying a communication time of a proposed transmission using at least one channel from among a plurality of channels which are capable of connecting the image communication apparatus to a destination, each of the communication channels being a same kind and having a same capacity for transmitting data per unit time;

manual selection means for manually selecting at least one channel from among said plurality of channels on the basis of the communication time displayed on the display means, such that said selected at least one channel forms a communication route to the destination; and communication means for communicating with the destination using said selected at least one channel.

11. The apparatus according to claim 10, wherein the communication means performs a communication control with one destination at a time through the selected at least one channel.

12. The apparatus according to claim 10, wherein the plurality of channels are included in one digital network.

13. A communication method comprising the steps of:

displaying a communication time of a proposed transmission using at least one channel from among a plurality of channels on a display, each of the communication channels being a same kind and having a same capacity for transmitting data per unit time;

manually selecting at least one channel from among the plurality of channels so that said at least one channel forms a communication route to a destination, wherein said at least one channel is selected on the basis of the communication time displayed on the display; and communicating with the destination through the at least one channel selected in the selection step.

14. A communication method of transmitting image data through a plurality of communication channels to a communication party, each of the communication channels being a same kind and having a same capacity for transmitting data per unit time, said method comprising the steps of:

detecting unused states of the plurality of communication channels;

recognizing an attribute associated with the image data, the attribute indicating a data amount of the image data;

determining an optimal number of channels of the plurality of communication channels to be used for transmission of the image data, on the basis of the unused states detected in said detecting step and the attribute recognized in said recognizing step, said determining step being able to determine the optimal number of channels to be less than a total number of unused channels indicated by the unused states; and transmitting the image data to the communication party by distributing the image data among the determined number of channels of the plurality of communication channels, wherein said recognizing step recognizes the attribute of the image data by checking whether the image data is color image data or monochrome image data.

15. A communication method of transmitting image data through a plurality of communication channels to a communication party, each of the communication channels being a same kind and having a same capacity for transmitting data per unit time, said method comprising the steps of:

detecting unused states of the plurality of communication channels;

recognizing an attribute associated with the image data, the attribute indicating a data amount of the image data;

determining an optimal number of channels of the plurality of communication channels to be used for transmission of the image data, on the basis of the unused states detected in said detecting step and the attribute recognized in said recognizing step, said determining step being able to determine the optimal number of channels to be less than a total number of unused channels indicated by the unused states; and transmitting the image data to the communication party by distributing the image data among the determined number of channels of the plurality of communication channels, wherein said recognizing step recognizes the attribute of the image data by checking a resolution of the image data.

* * * * *

UNITED STATES PATENT AND TRADEMARK OFFICE
CERTIFICATE OF CORRECTION

PATENT NO. : 5,774,654

DATED : June 30, 1998

INVENTOR(S): NOBUHIKO MAKI

It is certified that error appears in the above-identified patent and that said Letters Patent is hereby corrected as shown below:

COLUMN 2

Line 55, "denote" should read --denotes--.

Signed and Sealed this

Eleventh Day of May, 1999

Attest:

Q. TODD DICKINSON

Attesting Officer  Acting Commissioner of Patents and Trademarks